United States Patent
Montero et al.

(10) Patent No.: US 7,757,060 B2
(45) Date of Patent: Jul. 13, 2010

(54) REDUCING WAKE LATENCY TIME FOR POWER CONSERVING STATE TRANSITION

(75) Inventors: Adolfo Sandor Montero, Austin, TX (US); Craig Lawrence Chaiken, Pflugerville, TX (US); Andrew Thomas Sultenfuss, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 427 days.

(21) Appl. No.: 11/530,829

(22) Filed: Sep. 11, 2006

(65) Prior Publication Data

US 2008/0065845 A1    Mar. 13, 2008

(51) Int. Cl.
    *G06F 13/10*    (2006.01)
(52) U.S. Cl. ...................................... 711/165
(58) Field of Classification Search ............... 711/165
    See application file for complete search history.

(56) References Cited

U.S. PATENT DOCUMENTS

| 5,497,490 | A | 3/1996 | Harada et al. |
| 7,313,684 | B2 * | 12/2007 | O'Connell ............... 713/2 |
| 7,565,558 | B2 * | 7/2009 | Huang et al. ............ 713/300 |
| 2002/0078338 | A1 * | 6/2002 | Lay et al. ............... 713/2 |

OTHER PUBLICATIONS

Advanced Power Management (APM) BIOS Interface Specification, Revision 1.2, Feb. 1996, Intel Corporation/Microsoft Corporation.
Advanced Configuration and Power Interface Specification, Revision 3.0a, Dec. 30, 2005, pp. 1-85, Hewlett-Packard Corporation et al.

* cited by examiner

*Primary Examiner*—Tuan V Thai
*Assistant Examiner*—Duc T Doan
(74) *Attorney, Agent, or Firm*—Haynes and Boone, LLP

(57) ABSTRACT

For reducing wake latency time of an information handling system (IHS), a non-volatile random access memory (NVRAM) of the IHS is updated every time a main random access memory (RAM) of the IHS is changed or refreshed, thereby saving memory data. In response to a sleep event, the IHS is transitioned from a higher activity state to a sleep state, thereby removing power provided to the RAM. In response to a resume event, the IHS is restored back to the higher activity state from the sleep state. Upon restoring the power to the RAM, contents of the NVRAM are copied to the RAM to restore the memory data in a virtually instant manner.

17 Claims, 6 Drawing Sheets

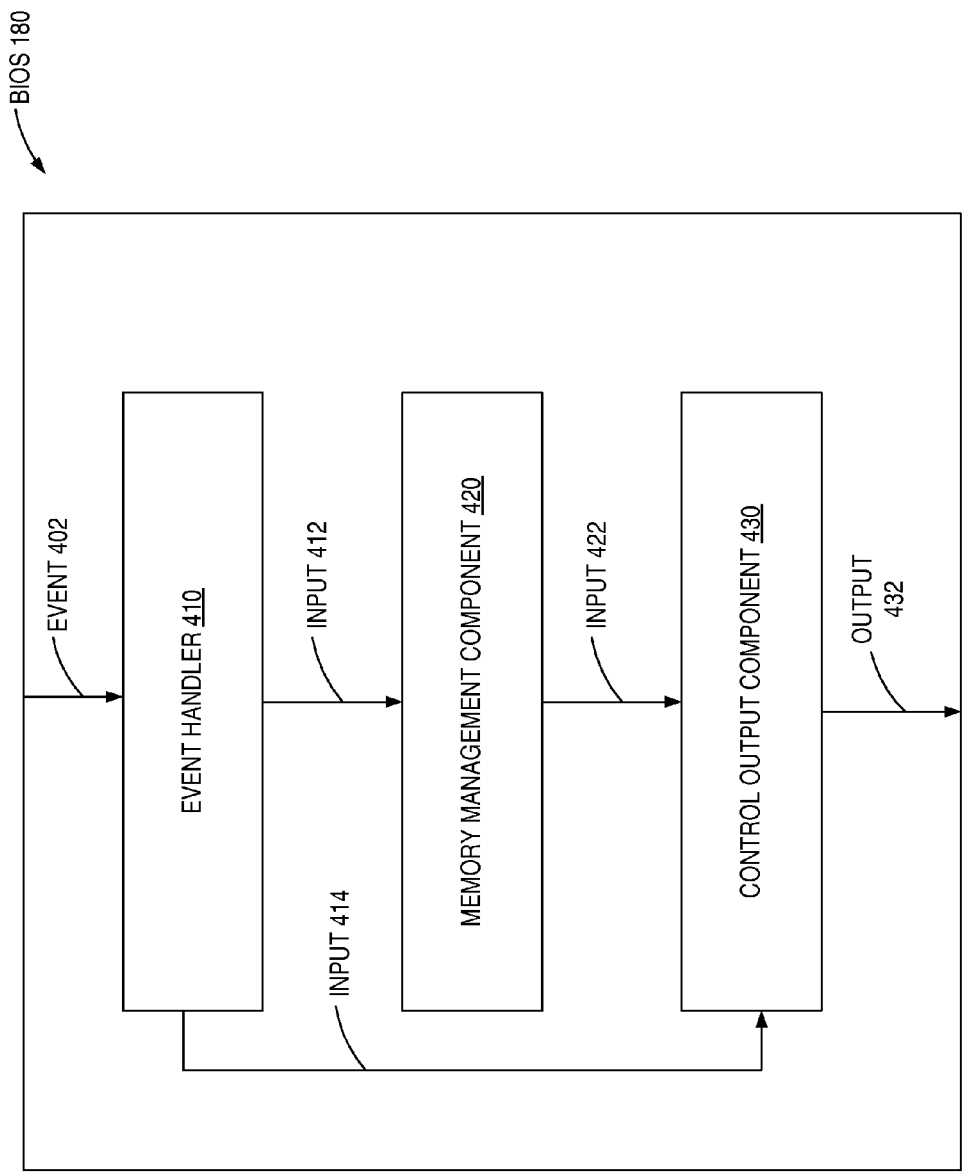

REDUCING WAKE LATENCY TIME FOR POWER CONSERVING STATE TRANSITION

BACKGROUND

The present disclosure relates to an information handling system, and more particularly to an information handling system transitioning between various power conserving states.

As the value and use of information continues to increase, individuals and businesses seek additional ways to acquire, process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, entertainment, and/or global communications. In addition, IHSs may include a variety of hardware and software components that may be configured to process, store, and communicate information and may include one or more computer systems, data storage systems, and networking systems.

To reduce power consumption, an IHS may be placed into a variety of different activity states or operational states with differing levels of power consumption. Many sophisticated power management schemes have been developed and implemented as industry standards.

Such power management standards define a variety of operational states depending upon system activity and the amount of power being consumed. For example, the ACPI specification defines various "sleeping" states such as S1, S2, S3, S4 and S5, which are available within the G1 global sleeping state. States S1-S4 may have differing wakeup latency times (or resume times) depending upon which devices are inactive, how much computer system context was saved prior to entering the sleep state, and similar other factors. In the S3 state (also referred to as a suspend state), which is a low wake latency sleeping state, all system context is lost except system memory. Hardware platform maintains memory context and restores some processor and cache memory configuration context. Control starts from the processor's reset vector after the wake event. The S4 state (also referred to as a hibernate state) is the lowest power sleeping state and typically has the longest wake latency. Thus, while in the S4 state, the IHS system consumes a minimal amount of power. Therefore, the S4 state may be maintained for a significantly longer duration of time compared to the S3 state since the S3 state typically consumes a finite amount of power to maintain contents of the memory.

In the S4 state, typically no instructions are executed by the processor, almost all devices included in the computer system are inactive, and the computer system generally awaits occurrence of a wakeup or resume event to transition it to a higher activity state. Awakening (or resuming) from the S4 state typically requires the longest wake latency time (or resume time), especially compared to resuming from the S3 state, because the memory image containing the system context is typically loaded from an electromechanical device such as a hard disk drive (HDD) into the random access memory (RAM). Thus, the S4 resume time is presently bounded by the performance limitations of the HDD, such as the peak sustained throughput of the HDD.

Therefore, a need exists for an improved wake latency time when transitioning from a power saving sleep state to a higher activity state. More specifically, a need exists to improve the wake latency time, with tools and techniques being preferably implementable as electronic devices that have no moving parts. Accordingly, it would be desirable to provide a for improving wake latency time of an IHS, absent the disadvantages discussed above.

SUMMARY

The foregoing need is addressed by the teachings of the present disclosure, which relates to reducing power consumption. According to one embodiment, a non-volatile random access memory (NVRAM) of the IHS is updated every time a main RAM of the IHS is changed or refreshed, thereby saving memory data. In response to a sleep event, the IHS is transitioned from a higher activity state to a sleep state, thereby removing power provided to the RAM. In response to a resume event, the IHS is restored back to the higher activity state from the sleep state. Upon restoring the power to the RAM, contents of the NVRAM are copied to the RAM to restore the memory data in a virtually instant manner.

In one embodiment, conserving power includes receiving a request to transition from a higher activity state to a sleep state. In response to the request, contents of a main RAM are copied to a NVRAM, thereby saving the system's operating state prior to the transition. A transition is made from the higher activity state to the sleep state in response to a completion of the copying. Entering the sleep state removes the power provided to the RAM. Another request is received to return from the sleep state to the higher activity state. The higher activity state is restored and the sleep state is exited in response to the another request. Entering the higher activity state restores the power provided to the RAM. The contents of the NVRAM are copied to the RAM in response to restoring the power to the RAM.

Several advantages are achieved according to the illustrative embodiments presented herein. The embodiments advantageously provide improvements to speed up the restoration of the system operating state while transitioning from a sleep state to a higher activity state. In addition, the embodiments also provide reduced power consumption while in the S3 sleep state.

BRIEF DESCRIPTION OF THE DRAWINGS

FIG. 4 is an illustrative block diagram structure of a basic input output system (BIOS) described with reference to FIG. 1 for controlling various power conserving states, according to an embodiment.

DETAILED DESCRIPTION

Figure 1:
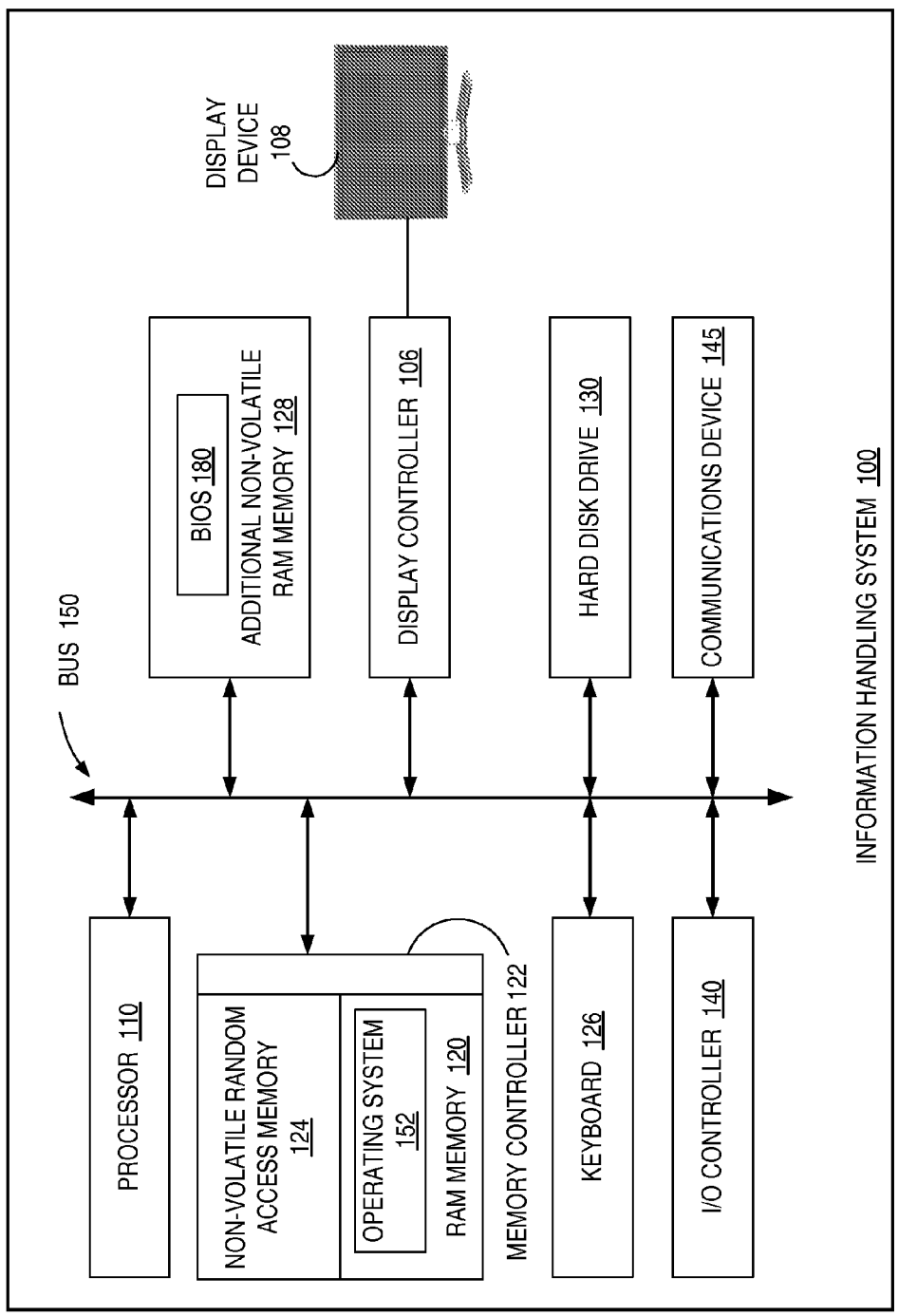
FIG. 1 illustrates a block diagram of an IHS having an improved wake latency time, according to an embodiment.

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices, boards, cards, modules, blocks, and/or components described herein may be implemented as hardware (including discrete components, integrated circuits and systems-on-a-chip 'SOC'), firmware (including application specific integrated circuits and programmable chips) and/or software or a combination thereof, depending on the application requirements.

As described above, in a traditional computer system the system context is typically saved on an HDD prior to entering the S4 or hibernate sleep state. The system context is loaded from the HDD into the RAM in response to a resume event. The S4 resume time is presently bounded by the performance limitations of the HDD, such as the peak sustained throughput of the HDD. In some computer systems, the S4 resume time may be measured in terms of several tens of seconds. There is a need to speed up the resume time while transitioning a computer system from a sleep state, e.g., a hibernate state, to a higher activity state such as the G0 state.

According to one embodiment, for reducing wake latency time of an IHS, an NVRAM of the IHS is updated every time a main RAM of the IHS is changed or refreshed, thereby saving memory data. In response to a sleep event, the IHS is transitioned from a higher activity state to a sleep state, thereby removing power provided to the RAM. In response to a resume event, the IHS is restored back to the higher activity state from the sleep state. Upon restoring the power to the RAM, contents of the NVRAM are copied to the RAM to restore the memory data in a virtually instant manner.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price. The IHS may include RAM, one or more processing resources such as central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to receive/transmit communications between the various hardware components.

FIG. 1 illustrates a block diagram of an IHS 100 with improved wake latency time, according to an embodiment. The IHS 100 includes a processor 110, a memory controller 122 coupled in parallel to a system RAM 120 (also referred to as main memory) and an NVRAM 124 (may also be referred to as a non-volatile read write memory (NVRWM)), an additional NVRAM 128 memory for storing BIOS 180, a display device 108 coupled to a display controller 106, a keyboard 126 and an I/O controller 140 for controlling various other I/O devices. For example, the I/O controller 140 may include a keyboard controller (KBC), a cursor device controller and/or the serial I/O controller. It should be understood that the term "information handling system" is intended to encompass any device having a processor that executes instructions from a memory medium.

The IHS 100 is shown to include an HDD 130 connected to the processor 110, although some embodiments may not include the HDD 130. In a particular embodiment, the IHS 100 may include additional hard disks. The processor 110 communicates with the system components via a bus 150, which includes data, address and control lines. In one embodiment, the IHS 100 may include multiple instances of the bus 150. In an exemplary, non-depicted embodiment, not all devices shown may be directly coupled to the bus 150. The multiple instances of the bus 150 may be in compliance with one or more proprietary standards and/or one or more industry standards such as PCI, PCIe, ISA, USB, SMBus, and similar others. A communications device 145, such as a network interface card and/or a radio device, may be connected to the bus 150 to enable wired and/or wireless information exchange between the IHS 100 and other devices (not shown). In an exemplary, non-depicted embodiment, the IHS 100 includes a real-time clock (RTC) to provide timing signal and keep track of date and time functions. In a particular embodiment, the RTC may be powered by a separate power source such as a battery in the event of a main power loss.

In a particular embodiment, the IHS 100 is placed in various operating states indicative of a level of activity of the processor 110. For example, when the level of activity of the processor 110 is below a predefined threshold then the IHS 100 may be placed in a sleep state to conserve power. In an embodiment, the various operating states of the IHS 100 are in compliance with at least one of at least one of an APM and an ACPI standard.

In a particular embodiment, the NVRAM 124 is a flash memory and is sized to be substantially equal to the RAM 120. That is, the NVRAM 124 is selected to have a memory size that substantially matches the size of the RAM 120. For example, an IHS having a main memory size of 1 giga bytes (GB) may include 1 GB of a double data rate (DDR2/DDR3) low latency memory and 1 GB of higher latency NVRAM. In a particular embodiment, the NVRAM 124 is placed on the same single in-line memory module (SIMM) or the dual in-line memory module (DIMM) used for the RAM 120. The NVRAM 124 may be implemented as a multi-chip module (MCM) chip package. In a particular embodiment, the NVRAM 124 may be implemented in various commercially available chips such as a FLASH memory chip and/or an electrically erasable programmable ROM (EEPROM) chip.

In a particular embodiment, the memory controller 122 is configured to automatically shadow (also referred to as checkpoint) main memory data. That is, the memory controller 122 is configured to automatically update and/or refresh the contents of the NVRAM 124 when contents of the RAM 120 are changed, updated and/or refreshed. Thus, content of the NVRAM 124 is automatically kept in synchronization with the content of the RAM 120. For applications sensitive to a large number of NVRAM write cycles, the memory controller 122 may be configured to reduce the number of write cycles. That is, the memory controller 122 may be configured to automatically checkpoint main memory data on an on-demand basis and/or due to an occurrence of an event, e.g., when transitioning from a higher activity state to a sleep state. In this embodiment, the number of write cycles to the NVRAM 124 may be advantageously reduced, thereby extending the life of the NVRAM 124. Additional detail of the checkpointing (or shadowing) mechanism is described with reference to FIGS. 3A and 3B.

In a particular embodiment, a portion of the additional NVRAM 128 is used to store the BIOS 180. In a particular embodiment, the BIOS 180 includes instructions to control the operation of the IHS 100 in various power conserving states. Additional detail of the BIOS 180 is described with reference to FIG. 4.

The processor 110 is operable to execute the computing instructions and/or operations of the IHS 100. The memory medium, e.g., RAM 120, preferably stores instructions (also known as a "software program") for implementing various embodiments of a method in accordance with the present disclosure. An operating system (OS) 152 of the IHS 100 is a type of software program that controls execution of other software programs, referred to as application software programs. In various embodiments the instructions and/or software programs may be implemented in various ways, including procedure-based techniques, component-based techniques, and/or object-oriented techniques, among others. The BIOS 180 is typically programmed in an assembly language. Specific examples include assembler, C, XML, C++ objects, Java and Microsoft Foundation Classes (MFC).

Figure 2A:
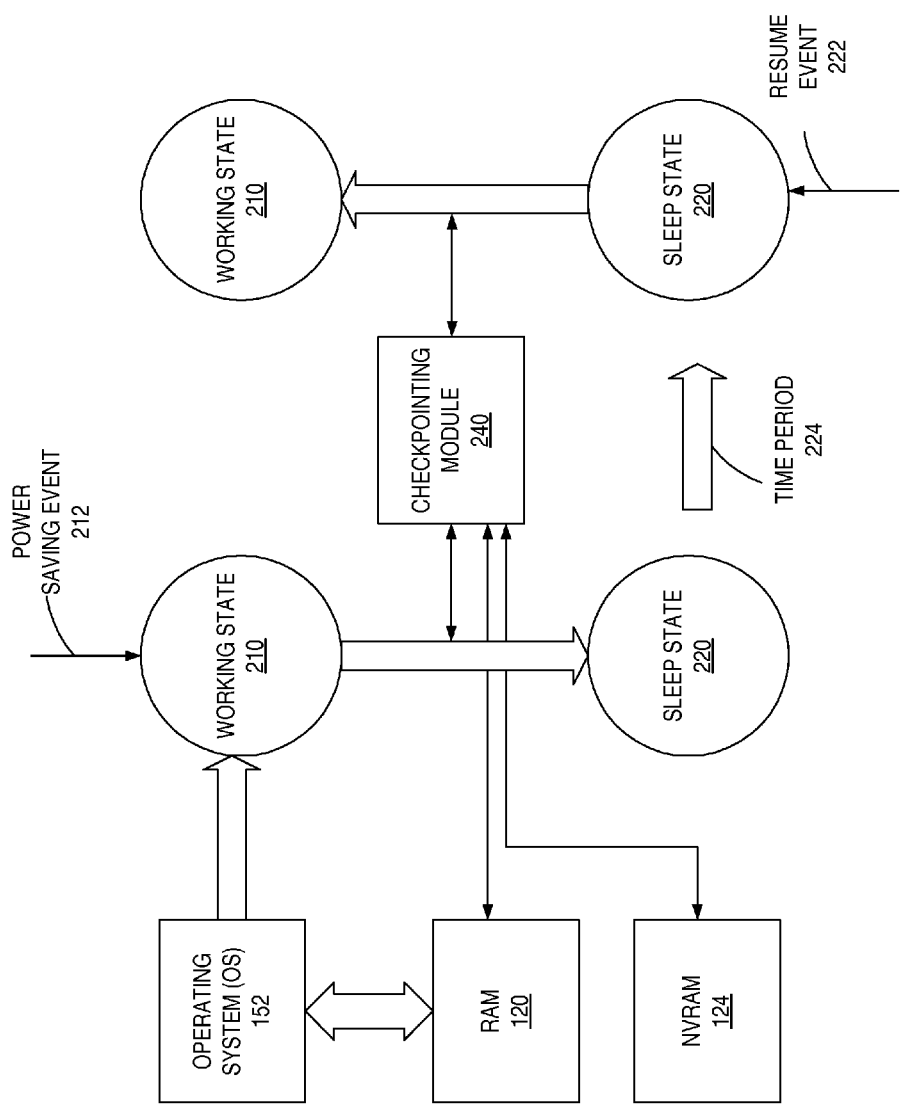
FIG. 2A is a block diagram structure illustrating a state transition sequence for an IHS described with reference to FIG. 1 having a write cycle sensitive NVRAM, according to an embodiment.

FIG. 2A is a block diagram structure illustrating a state transition sequence for an IHS described with reference to FIG. 1 having a write cycle sensitive NVRAM, according to an embodiment. Upon startup of the IHS 100, the control is transferred from the BIOS 180 to the OS 152 loaded into the RAM 120. The OS 152 controls read/write access to RAM 120. The IHS 100 is operating in a normal working state WS 210 (also referred to as G0 or S0 state). In the WS 210 state the IHS 100 is fully on and operational, and consuming maximum power. The activity of the processor 110 is above a predefined threshold. In response to a power saving event 212 (also referred to as a sleep event), such as a user initiated request or upon the activity of the processor 110 falling below the predefined level, the IHS 100 enters a sleep state 220. A system management interrupt (SMI) (not shown) may be generated in response to an occurrence of the power saving event 212.

In a particular embodiment, the sleep state 220 is a S4 sleeping state (or hibernate state). Prior to entering the sleep state 220, a checkpointing module 240 copies or checkpoints the contents of the RAM 120 to the NVRAM 124. The checkpoint module 240 is thus trigged during the transition from the WS 210 state to the sleep state 220. Additional detail of the checkpointing module 240 is described with reference to FIGS. 3A and 3B. In an embodiment, the number of write cycles to the NVRAM 124 may be advantageously reduced because the writing operation is performed in response to a change in the operating status to conserve power rather than performing the writing operation during each memory refresh cycle of the RAM 120. Additional detail of a checkpointing function performed during each refresh cycle of the RAM 120 is described with reference to FIG. 2B. In a particular embodiment, upon entering the sleep state 220 the IHS 100 exits the OS 152 and goes into a system management mode (SMM) (not shown). While the IHS 100 is in the sleep state 220 it is fully capable of responding to and servicing external interrupts (such as an incoming network communications) or by activating a keyboard or a mouse, even though the power to the IHS 100 is removed.

In an exemplary non-depicted embodiment, the sleep state 220 is a S3 sleeping state (or suspend state). Traditionally, when the IHS 100 enters the S3 sleeping state only the RAM 120 is provided power. In this embodiment, a transition to the S3 sleeping state is processed as a transition to the S4 sleeping state. When the IHS 100 enters the S4 sleeping state power to the RAM 120 is removed, thereby conserving additional power. In this embodiment, a time interval for a return from the S3 state and the S4 state to the higher activity level is substantially equal.

The IHS 100 may remain in the sleep state 220 to conserve power for an undefined period of time 224. In the sleep state 220, except for powering a real-time clock (which may be powered by an independent power source such as a battery) power is removed from all other components of the IHS 100. In this state, the IHS 100 is waiting to receive a wakeup or resume event 222, such as activating a keyboard input or receiving a network communications request via the communications device 145. The resume event 222 is indicative of a request to change the operating state from the sleep state 220 to a higher activity level state such as the state WS 210. An SMI may be generated in response to an occurrence of the resume event 222. In response to the resume event 222 and prior to entering the working state WS 210, the power is restored and the contents of the NVRAM 124 are copied back to the RAM 120 by the checkpointing module 240. The time for copying back the contents of the NVRAM 124 to the RAM 120 may depend on the particular hardware but is less than 1 second, resulting in the reduced wake latency time. Upon restoring the RAM 120, the control is transferred back from SMM mode to the OS 152. The IHS 100 is restored to the exact operating state prior to entering the sleep state 220 and is able to resume previous operations in the WS 210 state virtually instantly and without having to reload any additional data into the RAM 120. Thus, wake latency time is substantially reduced by restoring the RAM 120 to the exact previous operating without having to depend on performance of electromechanical devices such as a HDD to restore the RAM 120.

Figure 2B:
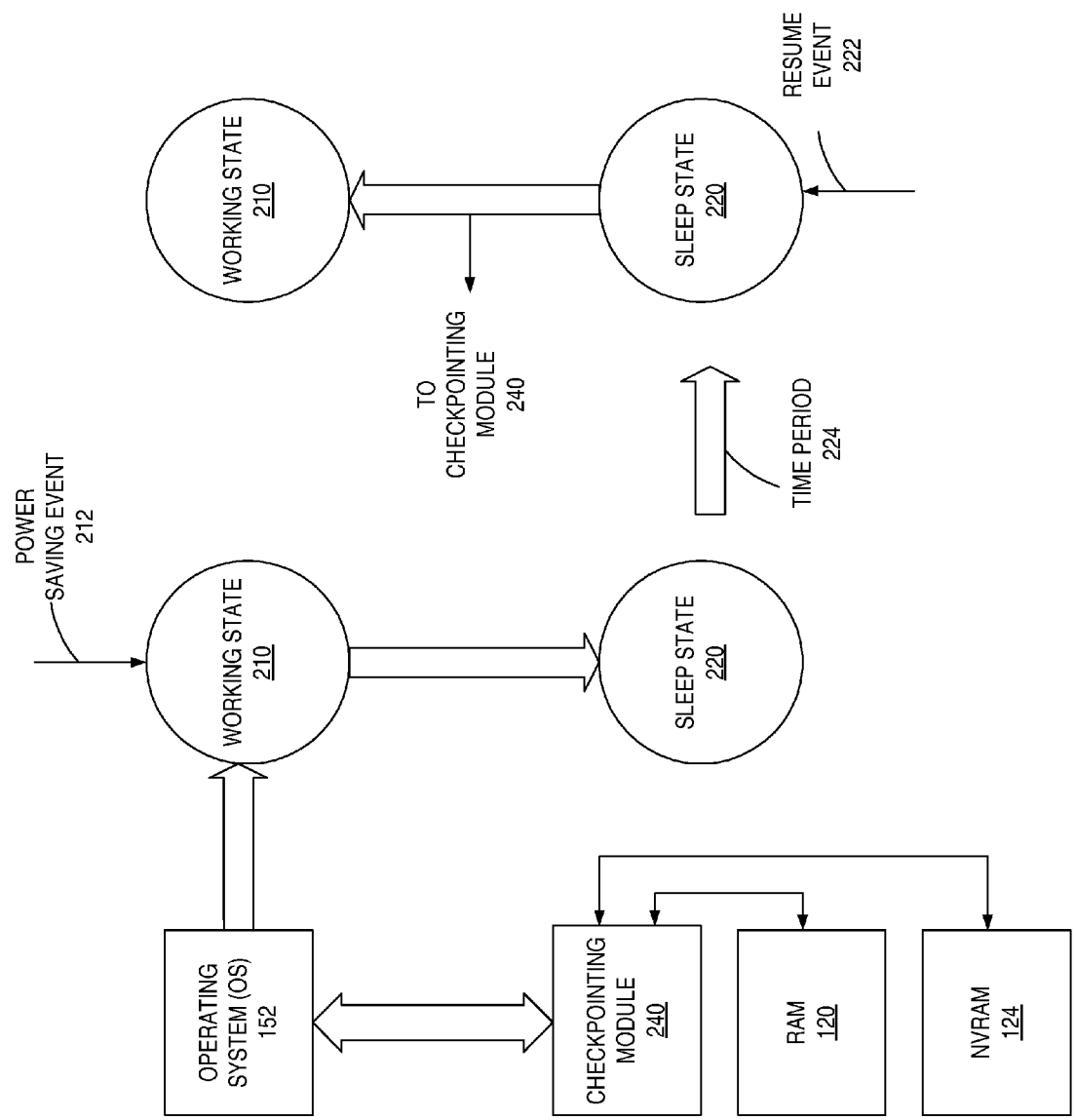
FIG. 2B is a block diagram structure illustrating a state transition sequence of an IHS described with reference to FIG. 1 having an improved wake latency time, according to an embodiment.

FIG. 2B is a block diagram structure illustrating a state transition sequence of an IHS described with reference to FIG. 1 having an improved wake latency time, according to an embodiment. Upon startup of the IHS 100, the control is transferred from the BIOS 180 to the OS 152 loaded into the RAM 120. The OS 152 controls read/write access to RAM 120 via the checkpointing module 240. In a particular embodiment, the checkpointing module 240 may be implemented in the memory controller 122 described with reference to FIG. 1. The memory controller 122 may be configured to automatically checkpoint the RAM 120 to the NVRAM 124 and checkpoint on an on-demand basis from the NVRAM 124 to the RAM 120. Thus, as described above, the memory controller 122 is configured to automatically update and/or refresh the contents of the NVRAM 124 when contents of the RAM 120 are changed, updated and/or refreshed. The updating of the NVRAM 124 may occur as an independent (may be asynchronous or synchronous) activity when the IHS 100 is operating in a normal working state WS 210 (also referred to as G0 or S0 state). In the WS 210 state the IHS 100 is fully on and operational, consuming maximum power. The activity of the processor 110 is above a predefined threshold. In response to a power saving event 212, such as the activity of the processor 110 falling below the predefined threshold, the IHS 100 enters a sleep state 220. An SMI (not shown) may be generated in response to an occurrence of the power saving event 212.

In a particular embodiment, the sleep state 220 is a S4 sleeping state (or hibernate state). The transition to the sleep state 220 is faster compared to the transition described with reference to FIG. 2A since the contents of NVRAM 124 are automatically and independently updated by the checkpointing module 240 when the RAM 120 is updated. In a particular embodiment, upon entering the sleep state 220 the IHS 100 exits the OS 152 and goes into an SMM. While the IHS 100 is in the sleep state 220 it is fully capable of responding to and servicing external interrupts (such as an incoming network communications) or by activating a keyboard or a mouse, even though the power to the IHS 100 is removed.

In an exemplary non-depicted embodiment, the sleep state 220 is a S3 sleeping state (or suspend state). Traditionally, when the IHS 100 enters the S3 sleeping state only the RAM 120 is provided power. In this embodiment, a transition to the S3 sleeping state is processed as a transition to the S4 sleeping state. When the IHS 100 enters the S4 sleeping state power to the RAM 120 is removed, thereby conserving additional power. In this embodiment, a time interval for a return from the S3 state and the S4 state to the higher activity level is substantially equal.

The IHS 100 may remain in the sleep state 220 to conserve power for an undefined period of time, e.g., the time period 224. In the sleep state 220, except for powering a real-time clock (which may be powered by an independent power source such as a battery), power is removed from all other components of the IHS 100. In this state, the IHS 100 is waiting to receive a wakeup or resume event 222, such as by activating a keyboard input or receiving a network communications request via the communications device 145. The resume event 222 is indicative of a request to change the operating state from the sleep state 220 to a higher activity level state such as the working state WS 210. In response to the resume event 222 and prior to entering the working state WS 210, the power is restored and the contents of the NVRAM 124 are copied back to the RAM 120 by the checkpointing module 240. The time for copying back the contents of the NVRAM 124 to the RAM 120 may depend on the particular hardware but is less than 1 second. Upon restoring the RAM 120, the control is transferred back from SMM mode to the OS 152. The IHS 100 is restored to the exact operating state prior to entering the sleep state 220. The IHS 100 is able to resume previous operations in the WS 210 state virtually instantly and without having to reload any additional data into the RAM 120. Thus, wake latency time is substantially reduced by restoring the RAM 120 to the exact previous operating state without having to depend on performance of electromechanical devices such as a HDD to restore the RAM 120.

Figure 3A:
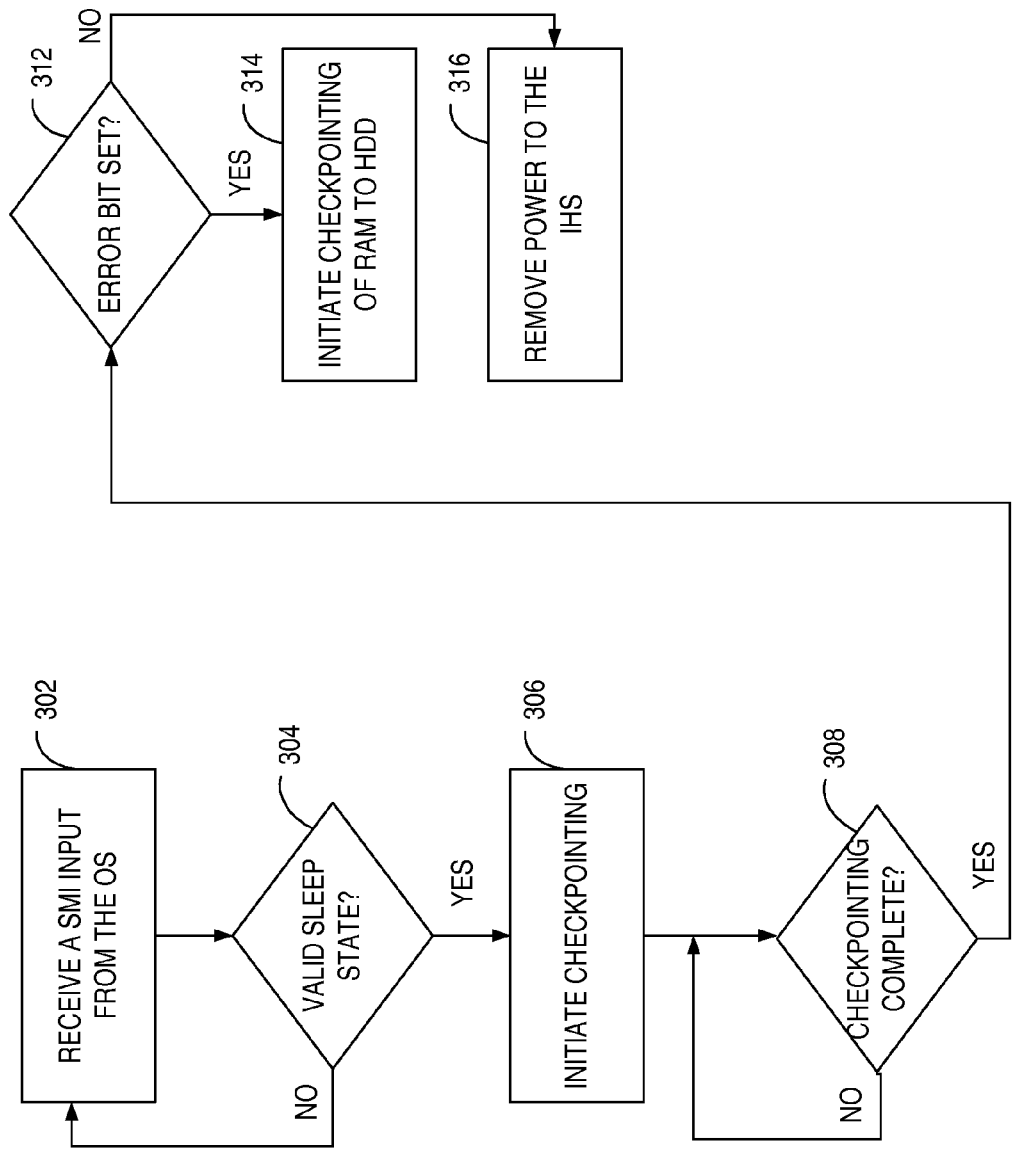
FIG. 3A is a flow chart illustrating a method for check-pointing RAM described with reference to FIGS. 1, 2A and 2B, according to an embodiment.

FIG. 3A is a flow chart illustrating a method for checkpointing RAM described with reference to FIGS. 1, 2A and 2B, according to an embodiment. At step 302, an SMI is received from the OS 152. The SMI is indicative of a request to transition the IHS 100 from the working state WS 210 to the sleep state 220. In a particular embodiment, the SMI may be generated in response to the power saving event 212. At step 304, a determination is made whether the sleep state 220 that is requested is valid, e.g., one of at least S3 or S4. Control is transferred back to step 302 if the requested sleep state in not valid. At step 306, in response to determining that the sleep state 220 that is requested is valid, a command is sent to initiate checkpointing (or shadowing) of the RAM 120 to the NVRAM 124. In a particular embodiment, the command may be in accordance with the systems management bus (SMBus) standard. At step 308, a determination is made whether checkpointing is complete. For example, hardware for the checkpointing (such as the checkpointing module 240) may set a valid bit to indicate that the checkpointing is complete and may set an error bit to indicate presence of errors. The step 308 loops on itself if the checkpointing is not complete. At step 312, in response to determining that the checkpointing is complete, the error bit is checked if the checkpointing resulted in an error. At step 314, if the error bit was set then the checkpointing of the RAM 120 to the HDD 130 is initiated. At step 316, in response to determining that no checkpointing error occurred, the power is removed from the IHS 100 including the RAM 120.

Various steps described above may be added, omitted, combined, altered, or performed in different orders. For example, upon completion of the checkpointing an additional step may be performed to verify that the error bit itself is checkpointed at step 312 before removing power to the RAM 120. In another embodiment, the error bit may be stored in parallel in the RAM 120 and the NVRAM 124.

Figure 3B:
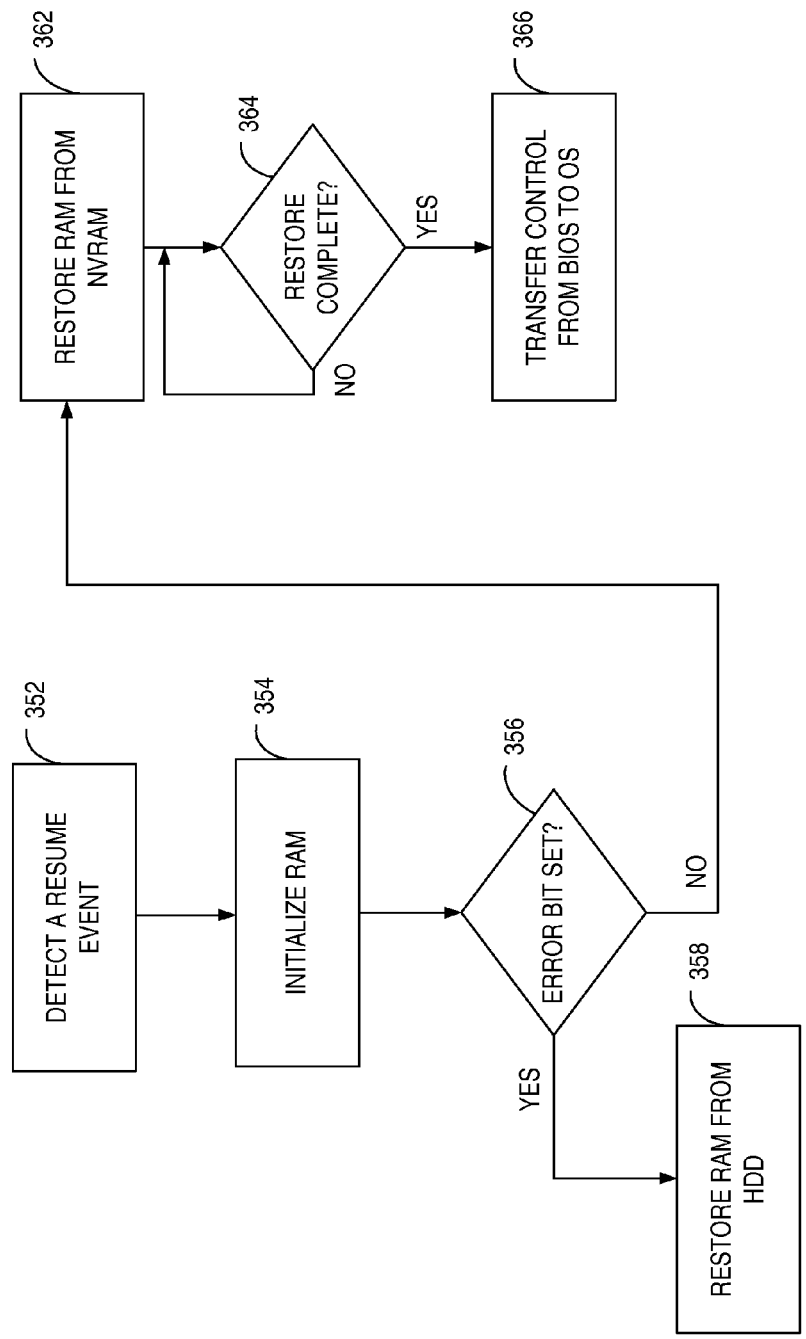
FIG. 3B is a flow chart illustrating a method for restoring RAM described with reference to FIGS. 1, 2A, 2B and 3A, according to an embodiment.

FIG. 3B is a flow chart illustrating a method for restoring RAM described with reference to FIGS. 1, 2A, 2B and 3A, according to an embodiment. At step 352, the resume event 222 is detected. As described above, the resume event 222 is indicative of a request to change the operating state from the sleep state 220 to a higher activity level state such as the working state WS 210. At step 354, the RAM 120 is initialized after restoration of the power provided to the IHS 100. At step 356, a determination is made whether the error bit described with reference to step 308 of FIG. 3A is set. At step 358, in response to the determination that the error bit was set then POST code is executed to restore the RAM 120 from the HDD 130. At step 362, in response to the determination that the error bit was not set then a command is sent to restore (e.g., checkpoint or shadow) the RAM 120 from the NVRAM 124. In a particular embodiment, the command may be in accordance with the SMBus standard. At step 364, a determination is made whether restoring is complete. For example, hardware for the restoring may set a valid bit to indicate that the restoration is complete. The step 364 loops on itself if the restoration is not complete. At step 366, in response to determining that the restoration is complete, the control is transferred from the SMM mode back to the OS 152.

Various steps described above may be added, omitted, combined, altered, or performed in different orders. For example, a separate step (not shown) may be added after the step 352 to restore the power to the IHS 100.

FIG. 4 is an illustrative block diagram structure of a BIOS 180 described with reference to FIG. 1 for controlling various power conserving states, according to an embodiment. In a particular embodiment, the BIOS 180 includes a plurality of modules (or portions of software) to control the various power conserving states and transitions between them. In the depicted embodiment, the BIOS 180 includes an event handler 410 operable to detect an occurrence of an event 402 such as the power saving event 212 and the resume event 222. In a particular embodiment, the event handler 410 may include code or instructions to handle an SMI received from the OS 152.

A memory management component 420 is operable for checkpointing or shadowing. In a particular embodiment, at least a portion of the memory management component 420, may use the checkpointing module 240 for implementing the checkpoint function. The memory management component 420 is operable to control copying of memory contents in-between the RAM 120 and the NVRAM 124 in response to an input 412 from the event handler 410. In a particular embodiment, the memory management component 420 may use the SMBus for controlling the checkpointing function. The BIOS 180 includes a control output component 430 operable to provide an output 432 to perform one or more predefined functions such as control power provided to the processor 110 and the RAM 120 in response to an input 414 from the event handler 410 and an input 422 from the memory management component 420. The control output component 430 is also operable to transfer control between the BIOS 180 and the operating system 152 of the IHS 100 responsive to the input 414 from the event handler 410.

It should be understood that while the disclosure described a BIOS implementation for controlling the various power conserving states, it would be within the spirit and scope of the disclosure to encompass an embodiment deploying an ACPI implementation included in the OS. As an additional example, the S3 and S4 sleeping states are described, it would be within the spirit and scope of the disclosure to encompass an embodiment deploying any other power conserving states.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for reducing wake latency time, the method comprising:
   copying contents of a main random access memory (RAM) to a non-volatile random access memory (NVRAM) in response to a refresh of the contents of the RAM, wherein sizes of the RAM and NVRAM are substantially equal;
   setting a checkpointing error bit to indicate a presence of errors in copying the contents of the main RAM to the NVRAM;
   transitioning from a higher activity state to a sleep state in response to a sleep event, wherein the sleep event removes power provided to the RAM;
   restoring from the sleep state to the higher activity state in response to a resume event, wherein the resume event restores the power provided to the RAM;
   copying contents of the NVRAM to the RAM in response to restoring the power to the RAM and in response to the checkpointing error bit not indicating the presence of errors in copying the contents of the main RAM to the NVRAM, thereby reducing the wake latency time; and
   verifying that the checkpointing error bit is checkpointed before removing power to the main RAM.

2. In the method of claim 1, wherein the NVRAM is a flash memory.

3. In the method of claim 1, wherein power saved while in the sleep state is substantially equal to power saved while in a traditional S4 state.

4. In the method of claim 1, wherein the wake latency time for the restoring from the sleep state to the higher activity state and from a traditional S4 state to the higher activity level is substantially equal.

5. In the method of claim 1, wherein the wake latency time is a time interval between the resume event and the restoring to the higher activity state and wherein the time interval is not greater than one second.

6. In the method of claim 1, wherein the sleep state and the higher activity state conforms to at least one of an advanced power management (APM) and an advanced configuration and power interface (ACPI) standard.

7. A method for conserving power, the method comprising:
   receiving a request to transition from a higher activity state to a sleep state;
   copying contents of a main RAM to an NVRAM in response to the request, wherein sizes of the RAM and NVRAM are substantially equal;
   setting a checkpointing error bit to indicate a presence of errors in copying the contents of the main RAM to the NVRAM;
   transitioning from the higher activity state to the sleep state in response to a completion of the copying, wherein the sleep state removes the power provided to the RAM;
   receiving another request to return to the higher activity state;
   restoring from the sleep state to the higher activity state in response to the another request, wherein the higher activity state restores the power provided to the RAM;
   copying contents of the NVRAM to the RAM in response to restoring the power to the RAM and in response to the checkpointing error bit not indicating the presence of errors in copying the contents of the main RAM to the NVRAM; and
   verifying that the checkpointing error bit is checkpointed before removing power to the main RAM.

8. In the method of claim 7, wherein the NVRAM is a flash memory.

9. In the method of claim 7, wherein the power saved while in the sleep state is substantially equal to the power saved while in a traditional S4 state.

10. In the method of claim 7, wherein a time interval for the restoring from the sleep state to the higher activity state and from a traditional S4 state to the higher activity level is substantially equal.

11. In the method of claim 10, wherein time interval is not greater than one second.

12. In the method of claim 7, wherein the sleep state and the higher activity state conforms to at least one of an APM and an ACPI standard.

13. An information handling system (IHS) comprising:
   a processor;
   a RAM coupled to the processor;
   an NVRAM coupled to the processor, wherein sizes of the RAM and NVRAM are substantially equal; and
   a basic input output system (BIOS) stored in the NVRAM, wherein the BIOS includes:
   an event handler operable to detect an occurrence of an event;
   a memory management component operable to control copying of memory contents in-between the RAM and the NVRAM in response to the event, and in response to a checkpointing error bit indicating a presence of errors in copying the contents of the RAM to the NVRAM, and verifying that the checkpointing error bit is checkpointed before removing power to the RAM; and
   a control output component operable to control power provided to the processor and the RAM in response to the event.

14. The system of claim 13, wherein the NVRAM is a flash memory.

15. The system of claim 13, wherein the event is a transition from a higher activity state to a sleep state, wherein the memory management component copies the memory contents from the RAM to the NVRAM in response to the transition and wherein the control output component removes the power provided to the processor and the RAM while in the sleep state.

16. The system of claim 15, wherein the event is a return from the sleep state to the higher activity state, wherein the memory management component copies the memory contents from the NVRAM to the RAM in response to the return and wherein the control output component restores the power provided to the processor and the RAM while in the higher activity state.

17. The system of claim 13, wherein a time interval for a return from the at least one of the sleep state and a traditional S4 state to the higher activity state is substantially equal.

* * * * *